US010556380B2

United States Patent
Kosugi et al.

(10) Patent No.: US 10,556,380 B2
(45) Date of Patent: Feb. 11, 2020

(54) THREE-DIMENSIONAL MOLDING PRODUCING METHOD, THREE-DIMENSIONAL MOLDING PRODUCING APPARATUS, THREE-DIMENSIONAL MOLDING, AND MOLDING MATERIAL

(71) Applicant: RENAISSANCE OF TECHNOLOGY CORPORATION, Shizuoka (JP)

(72) Inventors: Takashi Kosugi, Shizuoka (JP); Takafumi Kosugi, Shizuoka (JP)

(73) Assignee: RENAISSANCE OF TECHNOLOGY CORPORATION, Shizuoka (JP)

( * ) Notice: Subject to any disclaimer, the term of this patent is extended or adjusted under 35 U.S.C. 154(b) by 273 days.

(21) Appl. No.: 15/547,412

(22) PCT Filed: Nov. 27, 2015

(86) PCT No.: PCT/JP2015/083504
§ 371 (c)(1),
(2) Date: Jul. 28, 2017

(87) PCT Pub. No.: WO2016/121217
PCT Pub. Date: Aug. 4, 2016

(65) Prior Publication Data
US 2018/0015665 A1 Jan. 18, 2018

(30) Foreign Application Priority Data

Jan. 30, 2015 (JP) .................................. 2015-017785

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/188* (2017.08); *B29C 64/209* (2017.08);
(Continued)

(58) Field of Classification Search
None
See application file for complete search history.

(56) References Cited

U.S. PATENT DOCUMENTS

2001/0050031 A1 12/2001 Bredt et al.
2005/0001356 A1 1/2005 Tochimoto et al.
(Continued)

FOREIGN PATENT DOCUMENTS

JP  2001-150556 A  6/2001
JP  2003-515465 A  5/2003
(Continued)

OTHER PUBLICATIONS

International Search Report of related foreign Application PCT/JP2015/083504 dated Feb. 2, 2016.

*Primary Examiner* — Mary Lynn F Theisen
(74) *Attorney, Agent, or Firm* — Arent Fox LLP

(57) ABSTRACT

A three-dimensional molding producing apparatus (100) includes: a three-dimensional molding forming device (130) that forms a three-dimensional molding (300) by a powder lamination method by using a molding material (200) obtained by mixing a urethane resin powder with a gypsum powder and; and a urethane resin impregnating device (150) that impregnates a urethane resin into the three-dimensional molding (300). The three-dimensional molding producing apparatus (100) further includes: an aqueous medium dipping device (170) for immersing the three-dimensional molding (300) in an aqueous medium after impregnation of the urethane resin by the urethane resin impregnating device (150) is completed. This makes it possible to form a high-
(Continued)

strength three-dimensional molding in forming a three-dimensional molding by the powder lamination method. Furthermore, it is also possible to form a soft three-dimensional molding.

17 Claims, 10 Drawing Sheets

(51) Int. Cl.
    *B33Y 70/00*     (2015.01)
    *B33Y 30/00*     (2015.01)
    *B29C 64/188*     (2017.01)
    *B29C 64/245*     (2017.01)
    *B29C 64/209*     (2017.01)
    *B29C 64/218*     (2017.01)
    *G09B 23/30*     (2006.01)
    *B29K 105/16*     (2006.01)
    *B29K 475/00*     (2006.01)
    *B29K 509/00*     (2006.01)

(52) U.S. Cl.
    CPC .......... *B29C 64/218* (2017.08); *B29C 64/245* (2017.08); *B33Y 10/00* (2014.12); *B33Y 30/00* (2014.12); *B33Y 70/00* (2014.12); *B29K 2105/16* (2013.01); *B29K 2475/00* (2013.01); *B29K 2509/00* (2013.01); *G09B 23/30* (2013.01)

(56) References Cited

U.S. PATENT DOCUMENTS

| | | |
|---|---|---|
| 2006/0208388 A1 | 9/2006 | Bredt et al. |
| 2013/0085736 A1* | 4/2013 | Reihsen ................ G16H 50/50 703/11 |
| 2014/0275317 A1* | 9/2014 | Moussa ................ C09D 133/08 522/72 |
| 2015/0004403 A1* | 1/2015 | Matsui ................ B29C 67/0074 428/343 |
| 2015/0210016 A1* | 7/2015 | Okamoto ................ B29C 64/40 428/206 |

FOREIGN PATENT DOCUMENTS

| | | |
|---|---|---|
| JP | 2003-531220 A | 10/2003 |
| JP | 2005-096199 A | 4/2005 |
| JP | 2011-189661 A | 9/2011 |
| JP | 2014-166733 A | 9/2014 |
| JP | 2014-188886 A | 10/2014 |

\* cited by examiner

FIG. 5

| MIXING RATIO OF URETHANE RESIN POWDER (%) / THREE-DIMENSIONAL MOLDING MANUFACTURING STAGE | 0 | 5 | 10 | 20 | 30 | 40 | 50 | 60 |
|---|---|---|---|---|---|---|---|---|
| THREE-DIMENSIONAL MOLDING 300-2 (BEFORE URETHANE RESIN IMPREGNATION) | 40~50 | 35~45 | 50 | 55 | 45 | — | — | — |
| THREE-DIMENSIONAL MOLDING 300-3 (AFTER URETHANE RESIN IMPREGNATION) | 40~50 | 35~40 | 50 | 50 | 40~45 | — | — | — |
| THREE-DIMENSIONAL MOLDING 300-5 (AFTER AQUEOUS MEDIUM DIPPING) | 25~30 | — | 20~30 | 20~25 | 20~25 | 30 | 35~40 | 40~45 |

*"—" MEANS UNMEASURED

FIG. 6

| MIXING RATIO OF URETHANE RESIN POWDER (%) / POSSIBLE OR IMPOSSIBLE ITEM | 0 | 10 | 20 | 30 | 40 | 60 | 80 |
|---|---|---|---|---|---|---|---|
| WHETHER OR NOT SHAPE STORED IN WATER IS MAINTAINED | ○ | ○ | ○ | ○ | ○ | ○ | × |

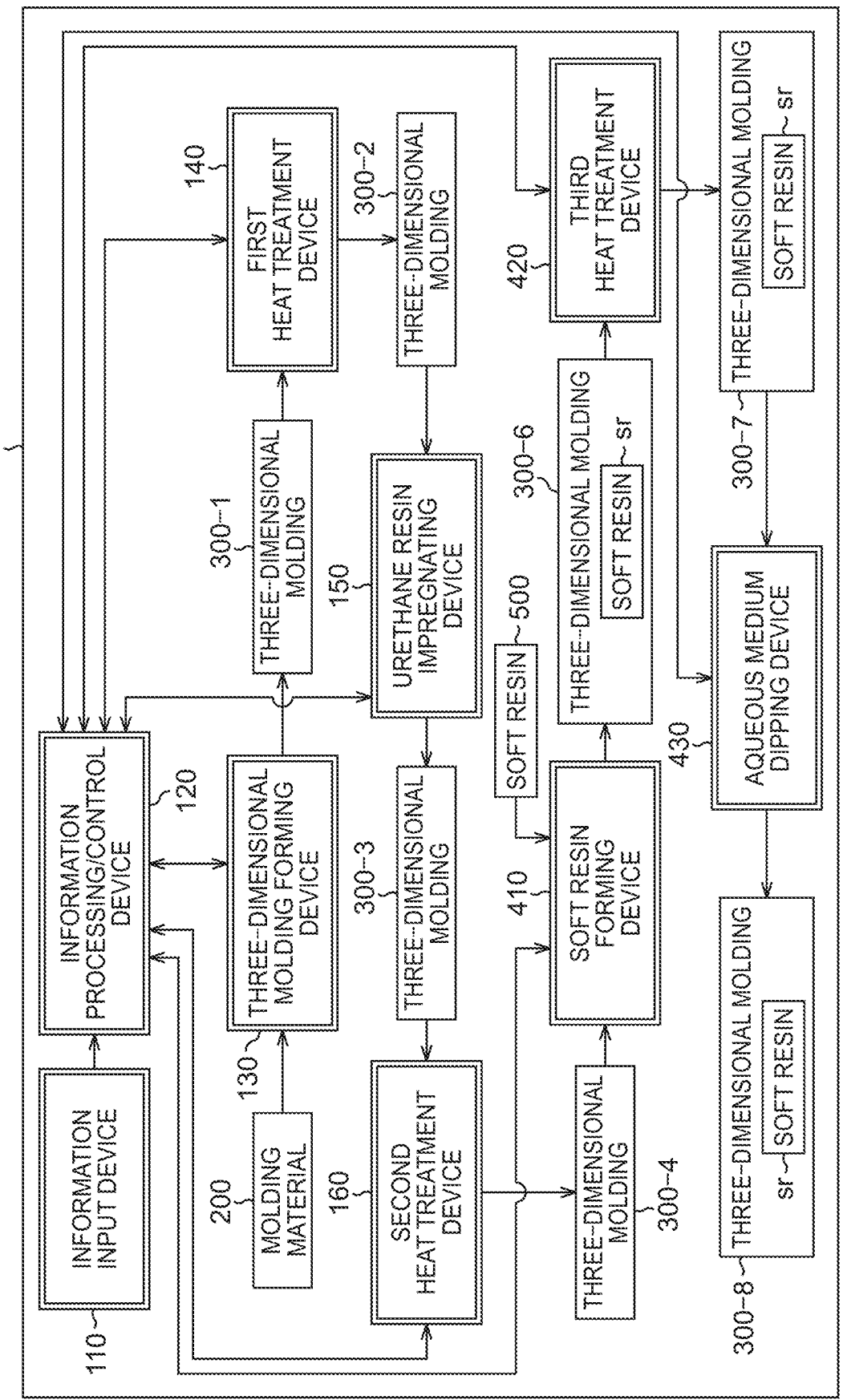

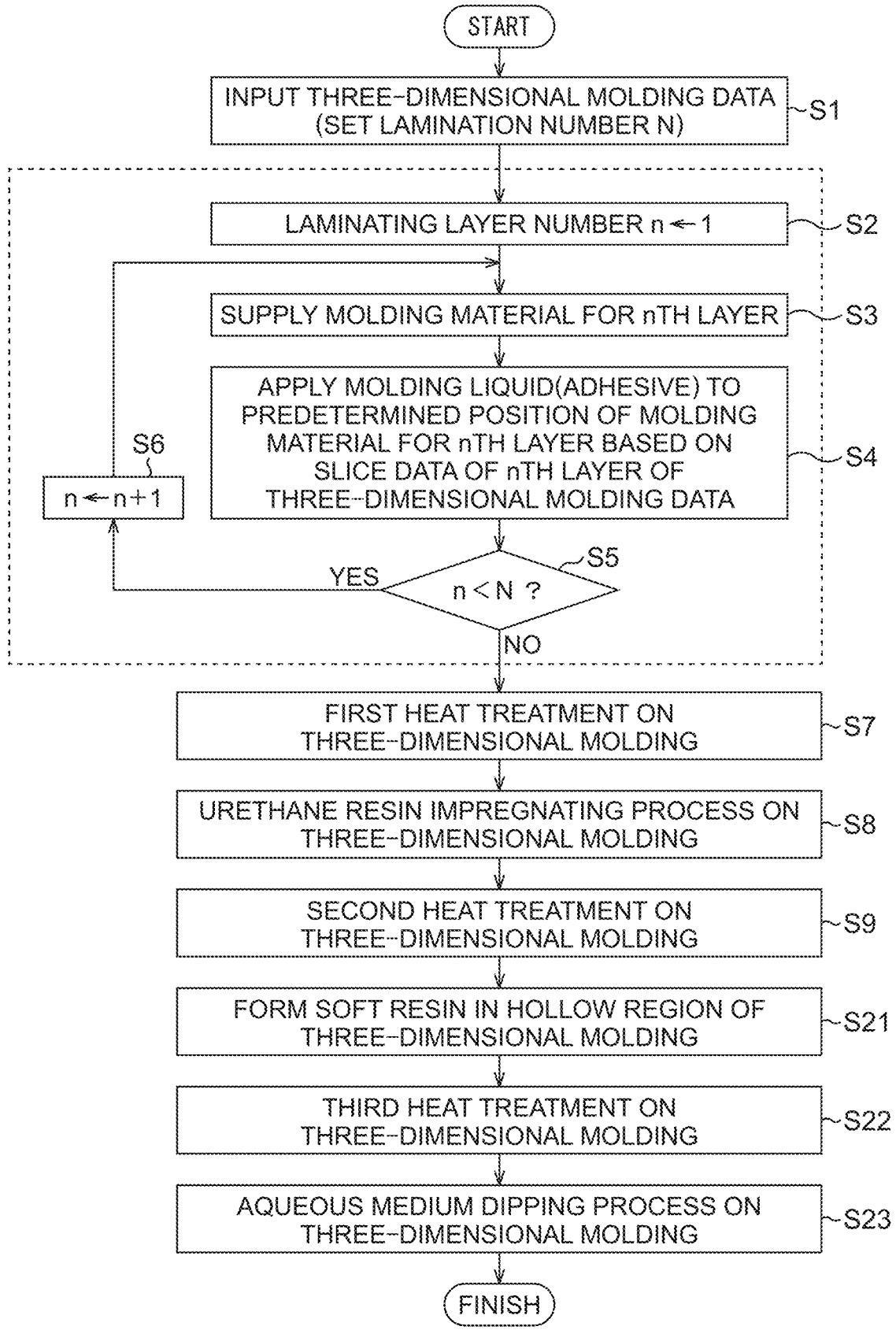

THREE-DIMENSIONAL MOLDING PRODUCING METHOD, THREE-DIMENSIONAL MOLDING PRODUCING APPARATUS, THREE-DIMENSIONAL MOLDING, AND MOLDING MATERIAL

CROSS-REFERENCE TO RELATED APPLICATIONS

This application is a National Stage entry of International Application No. PCT/JP2015/083504, filed Nov. 27, 2015, which claims priority to Japanese Patent Application No. 2015-017785, filed Jan. 30, 2015. The disclosures of the priority applications are incorporated in their entirety herein by reference.

TECHNICAL FIELD

The present invention relates to a three-dimensional molding formed by a powder lamination method, which is one type of molding method performed by a 3D printer, a producing method thereof, a producing apparatus thereof, and a molding material to be used when forming a three-dimensional molding by a powder lamination method.

BACKGROUND ART

The powder lamination method, which is one type of molding method performed by a 3D printer, is a method of forming a three-dimensional molding by jetting a molding liquid having an adhesive function onto a molding material placed flatly to let it solidify and thereby forming a single layer of the three-dimensional molding and laminating this layer.

As a technique by a conventional powder lamination method, for example, Patent Literature 1 below has disclosed a technique of using a gypsum powder as a main material of a molding material.

CITATION LIST

Patent Literature

Patent Literature 1: Japanese Laid-open Patent Publication No. 2014-188888

SUMMARY OF INVENTION

Technical Problem

However, in the technique disclosed in Patent Literature 1, the gypsum powder is used as the main material of the molding material, resulting in that a three-dimensional molding being a completed product becomes very brittle (low in strength). That is, the conventional technique has had a problem that it is difficult to form a three-dimensional molding that has a high strength and further is soft and capable of being imaged by an ultrasonograph in forming a three-dimensional molding by the powder lamination method.

The present invention has been made in consideration of such a problem, and an object thereof is to enable formation of a three-dimensional molding that has a high strength and further is soft and capable of being imaged by an ultrasonograph in forming a three-dimensional molding by a powder lamination method.

Solution to Problem

A three-dimensional molding producing method according to the present invention includes: using a molding material obtained by mixing a urethane resin powder with a gypsum powder and forming a three-dimensional molding by a powder lamination method; and impregnating a urethane resin into the three-dimensional molding.

The three-dimensional molding producing method according to another aspect of the present invention further includes: after the impregnating the urethane resin is completed, dipping the three-dimensional molding in an aqueous medium.

Further, the three-dimensional molding producing method according to another aspect of the present invention, in which an antiseptic and antifungal agent is dissolved in the aqueous medium.

Further, the three-dimensional molding producing method according to another aspect of the present invention further includes: after the impregnating the urethane resin is completed and before the dipping in the aqueous medium, forming, in a hollow region of the three-dimensional molding, a soft resin softer than the three-dimensional molding.

Further, the three-dimensional molding producing method according to another aspect of the present invention, in which the soft resin is formed of a urethane resin as a main material.

Further, the three-dimensional molding producing method according to another aspect of the present invention, in which the soft resin is formed by containing, in addition to the main material, an ultrasonic scattering material intended for showing the soft resin formed in the hollow region in ultrasonic imaging.

Further, the three-dimensional molding producing method according to another aspect of the present invention, in which a weight ratio of the urethane resin powder to a total weight of the molding material is 5% to 60%.

Further, the present invention includes: a three-dimensional molding producing apparatus that performs the above-described three-dimensional molding producing method; a three-dimensional molding produced by the above-described three-dimensional molding producing method; and a molding material to be used for the above-described three-dimensional molding producing method.

Advantageous Effects of Invention

According to the present invention, it is possible to form a high-strength three-dimensional molding in forming a three-dimensional molding by a powder lamination method. Furthermore, according to the present invention, it is also possible to form a soft three-dimensional molding. Additionally, according to the present invention, it is also possible to form a three-dimensional molding capable of being imaged by an ultrasonograph. For example, application of the technique of the present invention to the medical field enables formation of a three-dimensional molding that has reproduced an individual patient's internal organ in a form closer to the real thing, and thus, for example, the formed three-dimensional molding can be used for a general surgical operation training, a surgical operation training utilizing an ultrasonograph, and the like, resulting in that it becomes possible to achieve an improvement in medical care quality.

BRIEF DESCRIPTION OF DRAWINGS

FIG. 5 is a characteristic chart illustrating results of a rubber hardness test of three-dimensional moldings (before urethane resin impregnation), three-dimensional moldings (after urethane resin impregnation), and three-dimensional moldings (after aqueous medium dipping) that are produced by changing the weight ratio (%) of the urethane resin powder to the total weight of the molding material illustrated in FIG. 1, which illustrates the first embodiment of the present invention.

FIG. 6 is a chart illustrating whether or not a shape of each of the three-dimensional moldings produced by changing the weight ratio (%) of the urethane resin powder to the total weight of the molding material illustrated in FIG. 1, which are stored in water, is maintained, which illustrates the first embodiment of the present invention.

FIG. 7 is a block diagram illustrating one example of a schematic configuration of a three-dimensional molding producing apparatus according to a second embodiment of the present invention.

FIG. 8 is a flowchart illustrating one example of a process procedure in a three-dimensional molding producing method performed by the three-dimensional molding producing apparatus according to the second embodiment of the present invention.

DESCRIPTION OF EMBODIMENTS

Hereinafter, there will be explained modes for implementing the present invention (embodiments) with reference to the drawings.

First Embodiment

First, there will be explained a schematic configuration of a three-dimensional molding producing apparatus according to a first embodiment of the present invention.

Figure 1:
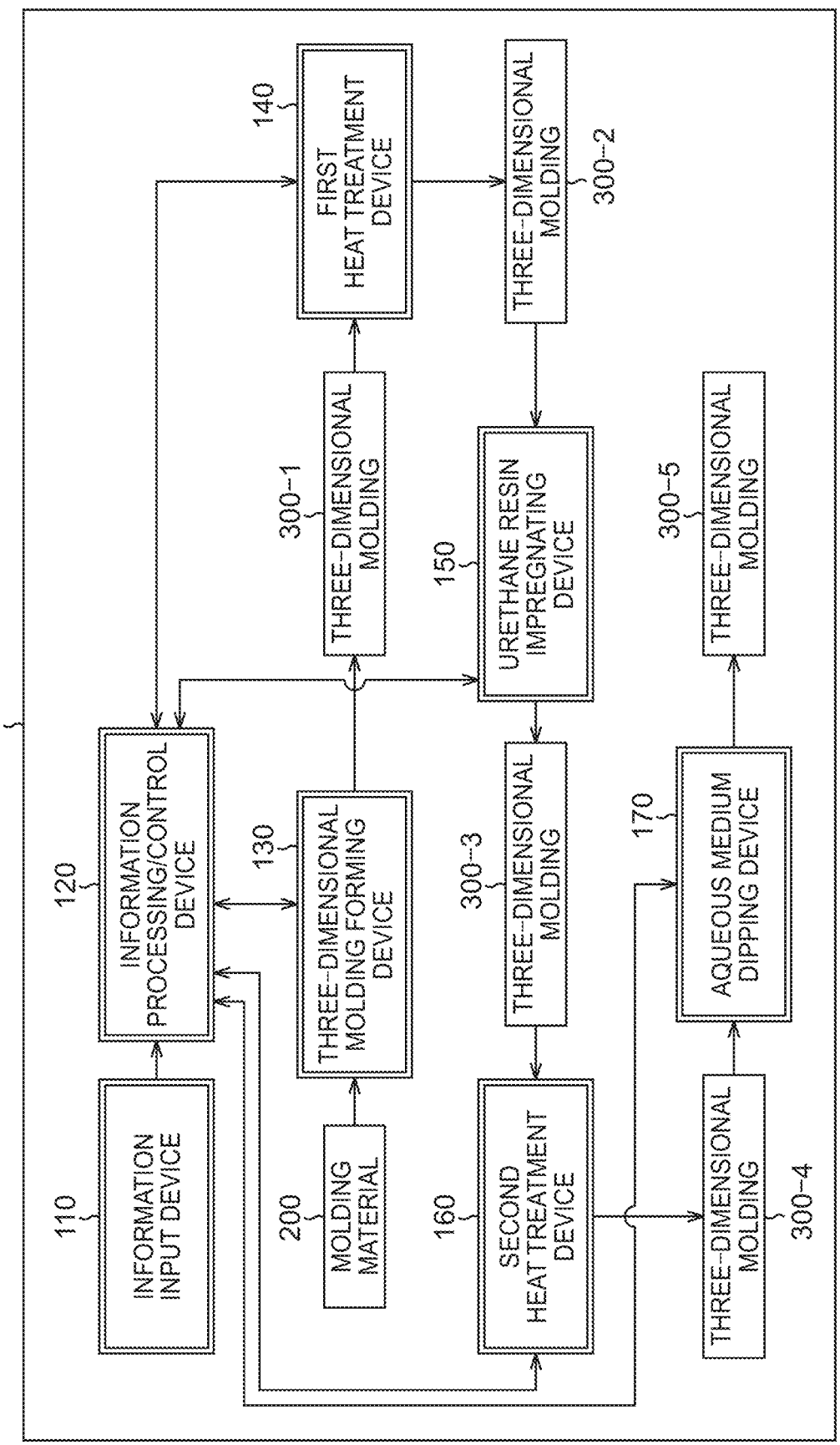
FIG. 1 is a block diagram illustrating one example of a schematic configuration of a three-dimensional molding producing apparatus according to a first embodiment of the present invention.

FIG. 1 is a block diagram illustrating one example of a schematic configuration of a three-dimensional molding producing apparatus 100 according to the first embodiment of the present invention.

The three-dimensional molding producing apparatus 100 according to this embodiment is configured by including: an information input device 110; an information processing/control device 120; a three-dimensional molding forming device 130; a first heat treatment device 140; a urethane resin impregnating device 150; a second heat treatment device 160; and an aqueous medium dipping device 170, as illustrated in FIG. 1.

The information input device 110 is a device that inputs various pieces of information including various data to the information processing/control device 120. This information input device 110 may be formed of a keyboard and a mouse in a personal computer, or may also be a communication interface for connecting to a computer network, for example.

The information processing/control device 120 is a device that processes the various pieces of information input from the information input device 110 and controls operations in the three-dimensional molding producing apparatus 100 in an overall manner. For example, the information processing/control device 120 controls the respective devices (130 to 170) in the three-dimensional molding producing apparatus 100 based on the various pieces of information input from the information input device 110.

The three-dimensional molding forming device 130 is a device that forms a three-dimensional molding 300-1 by a powder lamination method by using a molding material 200 obtained by mixing a urethane resin powder with a gypsum powder in accordance with the control by the information processing/control device 120. Incidentally, in this embodiment, the molding material 200 is that in addition to the urethane resin powder, an antiseptic and antifungal agent is further mixed with the gypsum powder.

Here, the molding material 200 is explained in detail.

The molding material 200 in this embodiment is that the urethane resin powder and the antiseptic and antifungal agent are mixed with the gypsum powder as described above. Concretely, in this embodiment, as the antiseptic and antifungal agent to be contained in the molding material 200, a silver-containing amorphous glass powder is used.

Hereinafter, weight ratios of respective powders contained in the molding material 200 will be described.

The weight ratio of the urethane resin powder contained in the molding material 200 to the total weight of the molding material 200 suitably falls within a range of 5% to 60%. This is because when the weight ratio of the urethane resin powder to the total weight of the molding material 200 becomes less than 5%, the gypsum is contained dominantly to cause a problem that the three-dimensional molding 300 being a completed product becomes brittle due to a strength deficiency, and when the weight ratio of the urethane resin powder to the total weight of the molding material 200 exceeds 60%, there is caused a problem that when the three-dimensional molding 300 being a completed product is stored (stored in an aqueous medium), the three-dimensional molding 300 breaks because the shape of the three-dimensional molding 300 cannot be maintained. Furthermore, from the viewpoint of increasing the strength of the three-dimensional molding 300 being a completed product, the weight ratio of the urethane resin powder to the total weight of the molding material 200 most suitably falls within a range of 20% to 40%. Further, the weight ratio of the antiseptic and antifungal agent contained in the molding material 200 to the total weight of the molding material 200 suitably falls within a range of 0.1% to 5%. This is because when the weight ratio of the antiseptic and antifungal agent to the total weight of the molding material 200 becomes less than 0.1%, there is caused a problem that an antiseptic and antifungal function of the three-dimensional molding 300 being a completed product becomes insufficient. Further, the weight ratio of the gypsum powder contained in the molding material 200 to the total weight of the molding material 200 suitably falls within a range of 35% to 94.9%.

The first heat treatment device 140 is a device that heat treats (first heat treats) the three-dimensional molding 300-1 formed in the three-dimensional molding forming device 130 at a predetermined temperature in accordance with the control by the information processing/control device 120. In this embodiment, the first heat treatment device 140 first performs, on the three-dimensional molding 300-1, a heat treatment for 30 minutes to one hour at a temperature of about 50° C., and then performs a heat treatment for 30 minutes to one hour at a temperature of about 80° C. In this example, the first heat treatment by the first heat treatment device 140 dries moisture of the entire three-dimensional molding 300-1 to make gypsum particles adhere to each other.

The urethane resin impregnating device 150 is a device that impregnates a urethane resin into a three-dimensional molding 300-2 resulting from the heat treatment by the first heat treatment device 140, in accordance with the control by the information processing/control device 120. Here, as an impregnating method performed by the urethane resin impregnating device 150, for example, a mode of using a brush to impregnate a urethane resin, a mode of spraying a urethane resin by a spray to impregnate it, a mode of dipping the three-dimensional molding 300-2 in a container filled with a urethane resin to impregnate the urethane resin into the three-dimensional molding 300-2, or the like can be employed. Further, in this embodiment, the urethane resin to be used in the urethane resin impregnating device 150 is not limited in particular as long as it is a liquid urethane resin and curable, but a one-component moisture curable urethane resin is preferred because its use makes it possible to achieve work simplification. Further, in this embodiment, as a material of urethane resin to be used in the urethane resin impregnating device 150, a urethane resin obtained by diluting a mixture of polyol and polyisocyanate with butyl acetate, ethyl acetate, or the like is used.

The second heat treatment device 160 is a device that heat treats (second heat treats) a three-dimensional molding 300-3 resulting from the urethane resin impregnation process in the urethane resin impregnating device 150 at a predetermined temperature in accordance with the control by the information processing/control device 120. In this embodiment, the second heat treatment device 160 first performs, on the three-dimensional molding 300-3, a heat treatment for 12 hours to 24 hours at a temperature of 15° C. or more, and then performs a heat treatment for about two hours at a temperature of about 80° C. In this example, the second heat treatment by the second heat treatment device 160 cures the urethane resin impregnated in the urethane resin impregnating device 150.

The aqueous medium dipping device 170 is a device that dips a three-dimensional molding 300-4 resulting from the heat treatment in the second heat treatment device 160 in an aqueous medium in accordance with the control by the information processing/control device 120. Here, the aqueous medium is not limited in particular as long as it does not impair strength and softness of the three-dimensional molding 300, but there can be cited a water, a physiological saline solution, a buffer solution, aqueous organic solvents such as glycerin and ethylene glycol, a mixture of these, and so on, and it is also possible to dissolve a water-soluble substance in these. Further, as one aspect, it is possible to add an antiseptic and antifungal agent to the above-described aqueous medium. The antiseptic and antifungal agent is not limited in particular as long as it has an antiseptic and antifungal function for the three-dimensional molding 300-4 and the aqueous medium and is a water-soluble antiseptic and antifungal agent that does not affect strength and softness of the three-dimensional molding 300, but considering handling and performing a surgical operation training, and the like, low irritating ones are preferred, there can be cited hydrogen peroxide, hypochlorous acid, sodium hypochlorite, phenoxyethanol, sodium benzoate, p-hydroxybenzoate ester or its salt, and so on, and each of them can be used at an appropriate concentration that enables exhibition of the antiseptic and antifungal function. In this embodiment, the aqueous medium dipping device 170 suitably dips, for example, the three-dimensional molding 300-4 in the aqueous medium having a temperature of 80° C. to 95° C. for about one hour. Then, on the occasion of performing a surgical operation training, or the like, for example, the three-dimensional molding producing apparatus 100 performs a process of taking a three-dimensional molding 300-5 out of the aqueous medium dipping device 170.

Incidentally, although the example illustrated in FIG. 1 illustrates the mode in which two heat treatment devices: the first heat treatment device 140; and the second heat treatment device 160 are provided, this embodiment is not limited to this mode, and for example, a mode in which a single heat treatment device is provided to perform both the first heat treatment by the first heat treatment device 140 and the second heat treatment by the second heat treatment device 160 is also applicable to this embodiment. Further, in the case of letting the three-dimensional molding 300 dry naturally over a long period of time, or the like, a mode in which either one or both of the first heat treatment device 140 and the second heat treatment device 160 are not provided is also applicable to this embodiment.

Next, there will be explained a process procedure of a three-dimensional molding producing method to be performed by the three-dimensional molding producing apparatus 100 according to the first embodiment of the present invention.

Figure 2:
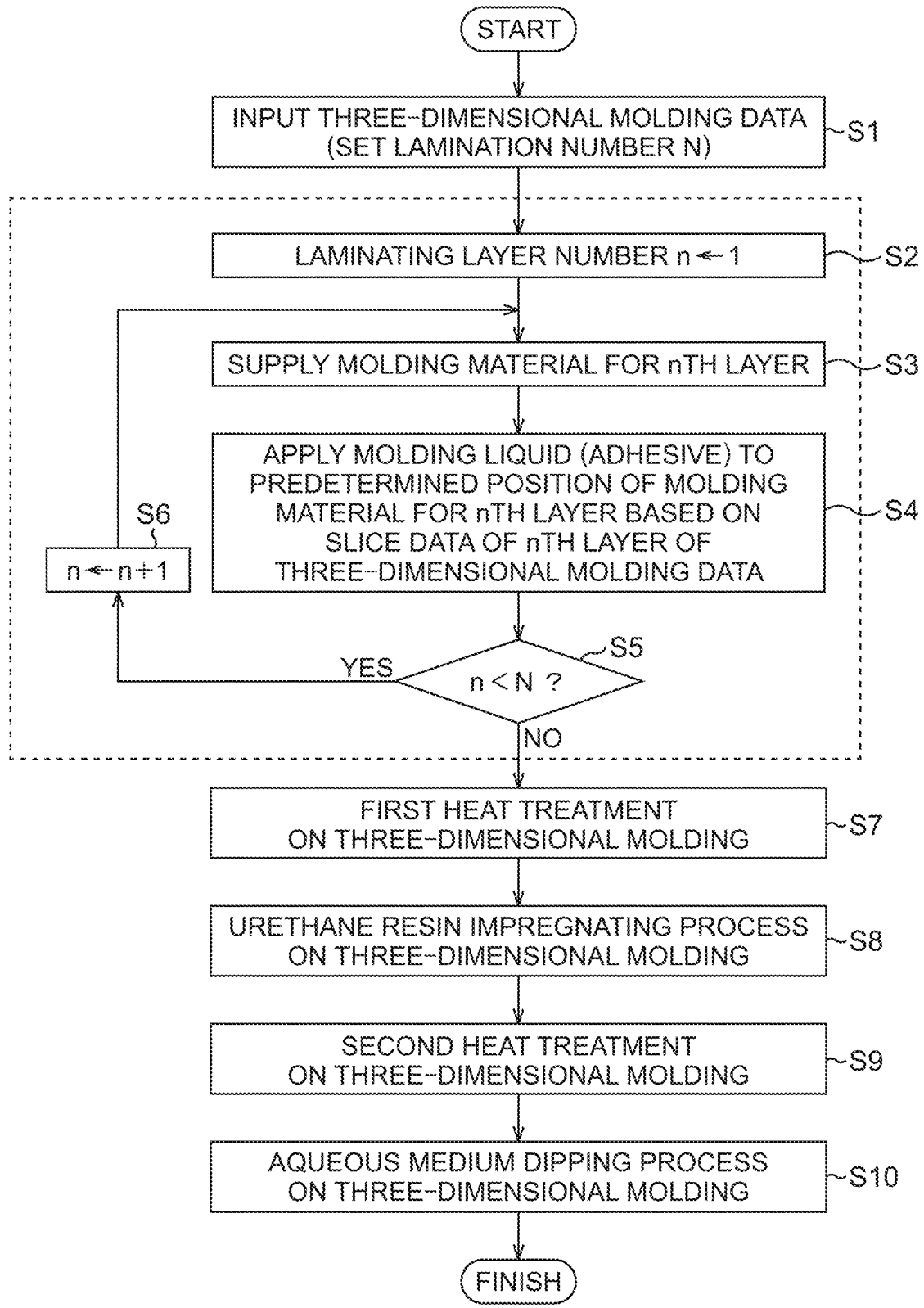
FIG. 2 is a flowchart illustrating one example of a process procedure in a three-dimensional molding producing method performed by the three-dimensional molding producing apparatus according to the first embodiment of the present invention.

FIG. 2 is a flowchart illustrating one example of the process procedure in the three-dimensional molding producing method to be performed by the three-dimensional molding producing apparatus 100 according to the first embodiment of the present invention. Hereinafter, processes of the flowchart illustrated in FIG. 2 will be explained with reference to FIG. 1.

First, at Step S1 in FIG. 2, the information input device 110 in FIG. 1 performs a process of inputting three-dimensional molding data to the information processing/control device 120. Then, the information processing/control device 120 processes the three-dimensional molding data input from, for example, the information processing/control device 110 into slice data of a lamination number N. Further, the information processing/control device 120 sets the lamination number N. Thereafter, the information processing/control device 120 transmits information related to slice data of respective layers of the three-dimensional molding data, information related to the lamination number N of the three-dimensional molding data, and the like to the three-dimensional molding forming device 130. Then, the three-dimensional molding forming device 130 that has received the information related to the slice data of the respective layers of the three-dimensional molding data, the information related to the lamination number N of the three-dimensional molding data, and the like from the information processing/control device 120 performs the following processes at Step S2 to Step S6 surrounded by a dotted line frame in FIG. 2.

At Step S2 in FIG. 2, the three-dimensional molding forming device 130 in FIG. 1 sets a laminating layer number n indicating a layer to be formed to one.

Subsequently, at Step S3 in FIG. 2, the three-dimensional molding forming device 130 in FIG. 1 supplies the molding material 200 for an nth layer to a molding region part in accordance with the control by the information processing/control device 120.

Subsequently, at Step S4 in FIG. 2, the three-dimensional molding forming device 130 in FIG. 1, in accordance with the control by the information processing/control device 120, applies a molding liquid having an adhesive function to a predetermined position of the molding material 200 for the nth layer based on the slice data of the nth layer of the three-dimensional molding data.

Subsequently, at Step S5 in FIG. 2, the three-dimensional molding forming device 130 in FIG. 1 determines whether or not the laminating layer number n set at present is smaller than the lamination number N set at Step S1.

As a result of the determination at Step S5, when the laminating layer number n set at present is smaller than the lamination number N set at Step S1 (S5/YES), the three-dimensional molding forming device 130 determines that the processes for the slice data of all the layers are not yet completed, and then proceeds to Step S6 in FIG. 2.

After proceeding to Step S6 in FIG. 2, the three-dimensional molding forming device 130 adds one to the laminating layer number n indicating a layer to be formed to change the laminating layer number n indicating a layer to be formed. Thereafter, returning to Step S3, the three-dimensional molding forming device 130 performs a process based on the changed laminating layer number n. That is, the processes at Step S3 to Step S6 out of the processes of the flowchart illustrated in FIG. 2 are as a result performed repeatedly by the lamination number N set at Step S1.

Further, as a result of the determination at Step S5, when the laminating layer number n set at present is not smaller than the lamination number N set at Step S1 (S5/NO), the three-dimensional molding forming device 130 determines that the processes for the slice data of all the layers are completed, and then proceeds to Step S7 in FIG. 2.

Here, before explaining Step S7 in FIG. 2, there will explained a concrete operation of the three-dimensional molding forming device 130 at Step S2 to Step S6 explained above.

Figure 3:
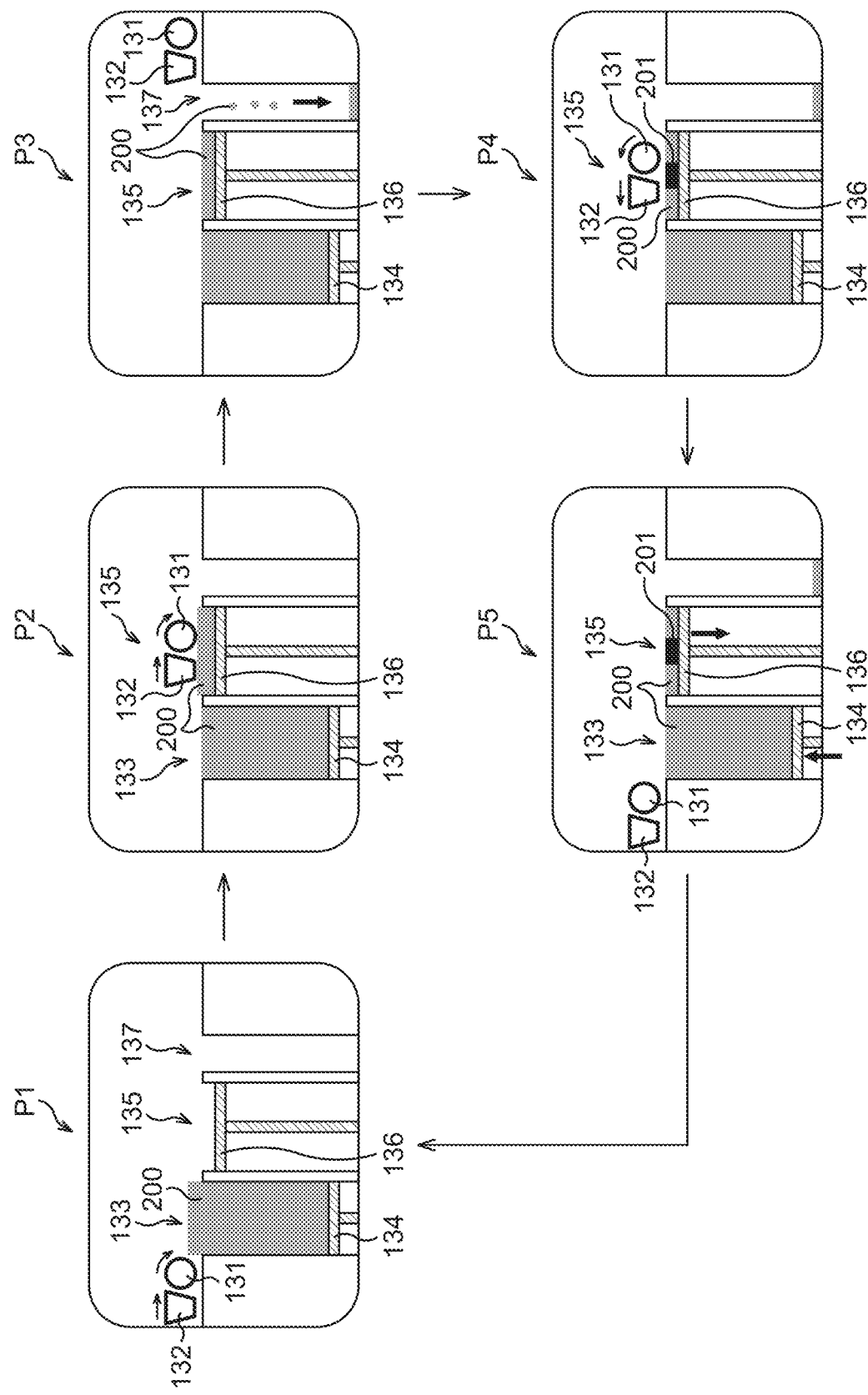
FIG. 3 is a schematic view illustrating one example of a concrete operation of a three-dimensional molding forming device illustrated in FIG. 1.

FIG. 3 is a schematic view illustrating one example of the concrete operation of the three-dimensional molding forming device 130 illustrated in FIG. 1. Concretely, FIG. 3 illustrates one example of a concrete operation of the three-dimensional molding forming device 130 when forming the three-dimensional molding 300-1 by the powder lamination method.

The three-dimensional molding forming device 130, as illustrated in a process P1 in FIG. 3, is configured by including a roller 131, a printer head 132, a molding material storage part 133, a piston 134, a molding region part 135, a piston 136, and a molding material drain part 137.

The roller 131 is intended to perform an operation for supplying the molding material 200 for each one layer to the molding region part 135.

The printer head 132, based on the slice data for the respective layers of the three-dimensional molding data, applies a molding liquid having an adhesive function to a predetermined position of the molding material 200 for each of the layers supplied to the molding region part 135. Here, in the example illustrated in FIG. 3, the printer head 132 is designed to operate together with the roller 131.

The molding material storage part 133 is where the molding material 200 to be used when forming the three-dimensional molding 300-1 by the powder lamination method is stored.

The piston 134 is intended to operate when supplying the molding material 200 stored in the molding material storage part 133 to the molding region part 135.

The molding region part 135 is a region part where the three-dimensional molding 300-1 is formed.

The piston 136 is intended to operate when forming the three-dimensional molding 300-1.

The molding material drain part 137 is intended to drain the redundant molding material 200 out of the molding material 200 supplied to the molding region part 135.

First, in the process P1 in FIG. 3, the roller 131 and the printer head 132 are located to the left of the molding material storage part 133. Then, in the process P1 in FIG. 3, the roller 131, together with the printer head 132, moves to the right of the paper while rolling.

Then, as illustrated in a process P2 in FIG. 3, a predetermined amount of the molding material 200 stored in the molding material storage part 133 is supplied to the molding region part 135.

Then, when the roller 131, together with the printer head 132, passes through the molding region part 135, as illustrated in a process P3 in FIG. 3, the molding material 200 supplied to the molding region part 135 is spread over to be flat and the molding material 200 for the first layer is laid out on the molding region part 135. Further, as illustrated in the process P3 in FIG. 3, the redundant molding material 200 made when the roller 131 spreads the molding material 200 over is drained into the molding material drain part 137. The process P3 in FIG. 3 illustrates a state where the roller 131 and the printer head 132 have moved to the right of the molding material drain part 137.

The steps illustrated in the process P1 in FIG. 3 to the process P3 in FIG. 3 correspond to Step S3 in FIG. 2.

Next, as illustrated in a process P4 in FIG. 3, when the printer head 132, together with the roller 131, moves to the left of the paper to arrive at the molding region part 135, the printer head 132 applies a molding liquid 201 having an adhesive function to a predetermined position of the molding material 200 for the first layer based on the slice data of the first layer of the three-dimensional molding data. On this occasion, it is possible to give various colors to the molding liquid 201 to be applied from the printer head 132, and thus when forming the three-dimensional molding 300-1 related to a patient's internal organ, for example, it is possible to form a three-dimensional molding in a form closer to the real thing, and further it also becomes possible to catch an affected part (lesion part), and the like.

The step illustrated in the process P4 in FIG. 3 corresponds to Step S4 in FIG. 2. Then, by going through the steps illustrated in the process P1 in FIG. 3 to the process P4 in FIG. 3, molding based on the slice data of the first layer of the three-dimensional molding data is completed.

After the application of the molding liquid 201 by the printer head 132 is completed, as illustrated in a process P5 in FIG. 3, the printer head 132 and the roller 131 move to a position to the left of the molding material storage part 133.

Next, in order to prepare for molding for the second layer, the piston 134 rises by a predetermined amount to push up the molding material 200 stored in the molding material storage part 133, and further the piston 136 falls by a predetermined amount to make a space in which the molding material 200 for the second layer is to be laid on the molding region part 135. Thereafter, proceeding to the step illustrated in the process P1 in FIG. 3, moldings for the second layer and after are performed.

When the slice data of the lamination number N exist as illustrated in FIG. 2, the steps in the process P1 in FIG. 3 to the process P5 in FIG. 3 are performed repeatedly by the number of the lamination number N.

Here, the process procedure is explained again returning to FIG. 2.

When the processes for the slice data of all the layers are completed, the process proceeds to Step S7 in FIG. 2.

After proceeding to Step S7 in FIG. 2, the first heat treatment device 140 in FIG. 1 heat treats (first heat treats) the three-dimensional molding 300-1 formed in the three-dimensional molding forming device 130 at a predetermined temperature in accordance with the control by the information processing/control device 120. In this embodiment, the first heat treatment device 140 first performs, on the three-dimensional molding 300-1, a heat treatment for 30 minutes to one hour at a temperature of about 50° C., and then performs a heat treatment for 30 minutes to one hour at a temperature of about 80° C.

Subsequently, at Step S8 in FIG. 2, the urethane resin impregnating device 150 in FIG. 1 performs a process of impregnating a urethane resin into the three-dimensional molding 300-2 resulting from the first heat treatment at Step S7 in accordance with the control by the information processing/control device 120. Here, as an impregnating method performed by the urethane resin impregnating device 150, for example, a mode of using a brush to impregnate a urethane resin, a mode of spraying a urethane resin by a spray to impregnate it, a mode of dipping the three-dimensional molding 300-2 in a container filled with a urethane resin to impregnate the urethane resin into the three-dimensional molding 300-2, or the like can be employed. Further, in this embodiment, the urethane resin to be used in the urethane resin impregnating device 150 is not limited in particular as long as it is a liquid urethane resin and curable, but a one-component moisture curable urethane resin is preferred because its use makes it possible to achieve work simplification. Further, in this embodiment, as a material of urethane resin to be used in the urethane resin impregnating device 150, a urethane resin obtained by diluting a mixture of polyol and polyisocyanate with butyl acetate, ethyl acetate, or the like is used.

Subsequently, at Step S9 in FIG. 2, the second heat treatment device 160 in FIG. 1 heat treats (second heat treats) the three-dimensional molding 300-3 resulting from the urethane resin impregnating process at Step S8 at a predetermined temperature in accordance with the control by the information processing/control device 120. In this embodiment, the second heat treatment device 160 first performs, on the three-dimensional molding 300-3, a heat treatment for 12 hours to 24 hours at a temperature of 15° C. or more, and then performs a heat treatment for about two hours at a temperature of about 80° C.

Subsequently, at Step S10 in FIG. 2, the aqueous medium dipping device 170 in FIG. 1 performs a process of dipping the three-dimensional molding 300-4 resulting from the second heat treatment at Step S9 in an aqueous medium in accordance with the control by the information processing/control device 120. Then, on the occasion of performing a surgical operation training, or the like, for example, the three-dimensional molding producing apparatus 100 performs a process of taking the three-dimensional molding 300-5 out of the aqueous medium dipping device 170.

Incidentally, in the case of letting the three-dimensional molding 300 dry naturally over a long period of time, or the like, according to need, a mode in which either one or both of the first heat treatment at Step S7 in FIG. 2 and the second heat treatment at Step S9 in FIG. 2 are omitted is also applicable to this embodiment.

After the process at Step S10 in FIG. 2 is completed, the processes of the flowchart illustrated in FIG. 2 are completed. By the processes of the flowchart illustrated in FIG. 2, the three-dimensional molding 300 formed by containing the gypsum and the urethane resin and (further containing the antiseptic and antifungal agent) by the powder lamination method is produced.

Next, there will be explained results of tests conducted by the present inventor.

Figure 4:
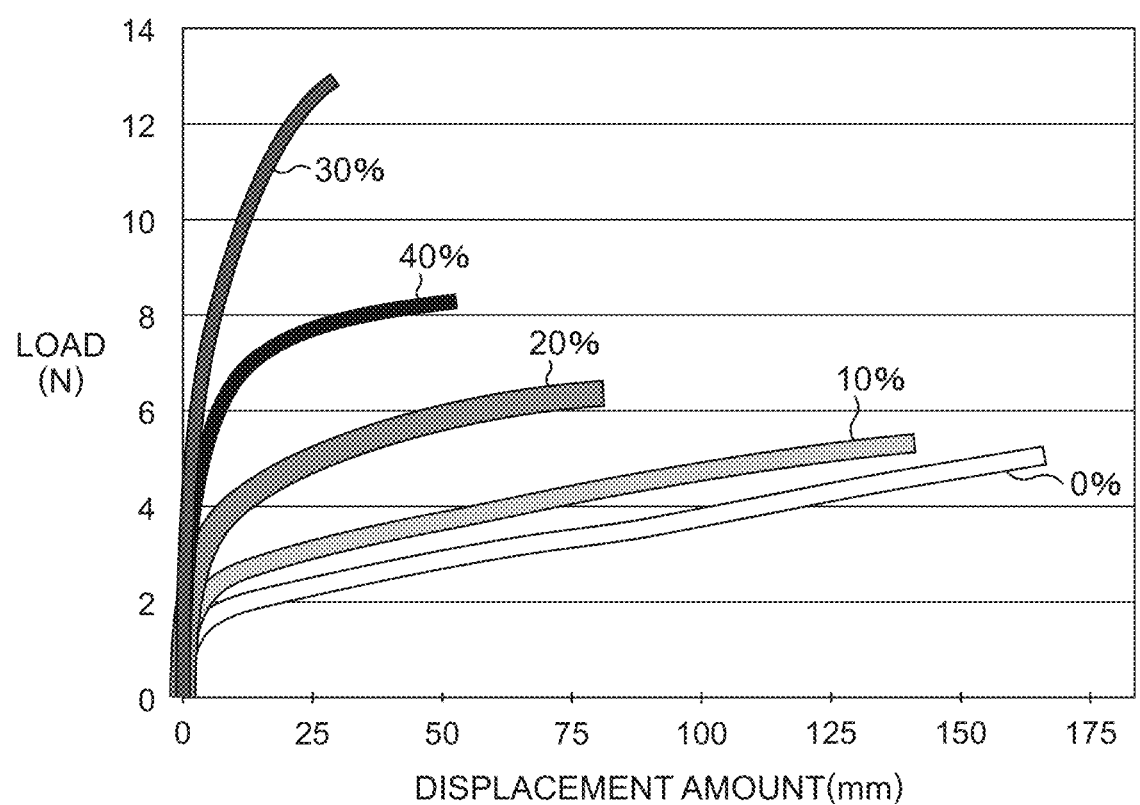
FIG. 4 is a characteristic chart illustrating results of a tensile strength test of three-dimensional moldings (after aqueous medium dipping) produced by changing a weight ratio (%) of a urethane resin powder to a total weight of a molding material illustrated in FIG. 1, which illustrates the first embodiment of the present invention.

FIG. 4 is a characteristic chart illustrating results of a tensile strength test of three-dimensional moldings 300-5 (after the aqueous medium dipping) produced by changing the weight ratio (%) of the urethane resin powder to the total weight of the molding material 200 illustrated in FIG. 1, which illustrates the first embodiment of the present invention. Concretely, FIG. 4 is a characteristic chart illustrating results of a tensile strength test of respective three-dimensional moldings 300-5 after being dipped in the aqueous medium for one week to two weeks in the aqueous medium dipping device 170 in FIG. 1 (later-described three-dimensional moldings 300-5 in FIG. 5 (after the aqueous medium dipping)). Further, FIG. 4 illustrates results of a tensile strength test performed until the respective three-dimensional moldings 300-5 break. That is, an end (right upper end) of each of graphs illustrated in FIG. 4 indicates that each test piece broke with a corresponding load. Further, FIG. 4 illustrates results obtained after the tensile strength test was performed with a gauge length of each test piece set to 50 mm. Further, FIG. 4 illustrates results obtained by using a tensile strength test device "AutoGraph AG-IS 50 kN" produced by SHIMADZU CORPORATION.

The results of the tensile strength test illustrated in FIG. 4 revealed that the three-dimensional moldings 300-5, each of which has a weight ratio of the urethane resin powder to the total weight of the molding material 200 being 10%, 20%, 30%, and 40%, each increase in tensile strength more than a three-dimensional molding having a weight ratio of the urethane resin powder to the total weight of the molding material 200 being 0% (namely, the urethane resin powder is not mixed as the molding material 200). As described above, in this embodiment, it is suitable that the weight ratio of the urethane resin powder contained in the molding material 200 to the total weight of the molding material 200 falls within a range of 5% to 60%. In terms of this point, although FIG. 4 does not illustrate the result of the tensile strength test of the case where the weight ratio of the urethane resin powder to the total weight of the molding material 200 is 5%, the present inventor has learned that a three-dimensional molding 300-5 having a weight ratio of the urethane resin powder to the total weight of the molding material 200 being 5% increases in tensile strength more than the three-dimensional molding having a weight ratio of the urethane resin powder to the total weight of the molding material 200 being 0% (namely, the urethane resin powder is not mixed as the molding material 200).

Further, as described above, in this embodiment, it is most suitable that the weight ratio of the urethane resin powder to the total weight of the molding material 200 falls within a range of 20% to 40%. The results of the tensile strength test illustrated in FIG. 4 make it possible to say that this point is valid from the viewpoint of increasing the strength of the three-dimensional molding 300 being a completed product.

FIG. 5 is a characteristic chart illustrating results of a rubber hardness test of three-dimensional moldings 300-2 (before the urethane resin impregnation), three-dimensional moldings 300-3 (after the urethane resin impregnation), and three-dimensional moldings 300-5 (after the aqueous medium dipping) that are produced by changing the weight ratio (%) of the urethane resin powder to the total weight of the molding material 200 illustrated in FIG. 1, which illustrates the first embodiment of the present invention. Concretely, the three-dimensional molding 300-5 (after the aqueous medium dipping) in FIG. 5 is one obtained after being dipped in the aqueous medium for one week to two weeks in the aqueous medium dipping device 170 in FIG. 1. Further, FIG. 5 illustrates results obtained by using a rubber hardness test device being a durometer type A.

The results of the rubber hardness test illustrated in FIG. 5 revealed that by being dipped in the aqueous medium, the three-dimensional moldings 300-5 (after the aqueous medium dipping) each become much softer than the three-dimensional moldings 300-2 (before the urethane resin impregnation) and the three-dimensional moldings 300-3 (after the urethane resin impregnation) each before being dipped in the aqueous medium. Further, the results of the rubber hardness test illustrated in FIG. 5 revealed that the three-dimensional moldings 300-5 (after the aqueous medium dipping) each become softer than the three-dimensional molding 300-2 having a weight ratio of the urethane resin powder to the total weight of the molding material 200 being 0% (before the urethane resin impregnation). Further, the results of the rubber hardness test illustrated in FIG. 5 revealed that by being impregnated with the urethane resin, the three-dimensional moldings 300-3 (before the urethane resin impregnation) having a weight ratio of the urethane resin powder to the total weight of the molding material 200 being 5%, 20%, and 30% each become softer, though being slight, than the three-dimensional moldings 300-2 each before being impregnated with the urethane resin (before the urethane resin impregnation).

FIG. 6 is a chart illustrating whether or not each shape of the three-dimensional moldings 300-5 produced by changing the weight ratio (%) of the urethane resin powder to the total weight of the molding material 200 illustrated in FIG. 1, which are stored in water, is maintained, which illustrates the first embodiment of the present invention. In FIG. 6, the three-dimensional molding 300-5 whose shape was able to be maintained when being stored in water is indicated by "○" and the three-dimensional molding 300-5 whose shape was not able to be maintained when being stored in water is indicated by "×."

As illustrated in FIG. 6, it was possible to obtain a result that as for the three-dimensional moldings 300-5 having a weight ratio of the urethane resin powder to the total weight of the molding material 200 illustrated in FIG. 1 being up to 60%, the shape of the three-dimensional molding 300-5 can be maintained when the three-dimensional molding 300-5 is stored in the aqueous medium, while as for the three-dimensional molding having a weight ratio of the urethane resin powder to the total weight of the molding material 200 illustrated in FIG. 1 being 80%, the shape of the three-dimensional molding cannot be maintained to break when the three-dimensional molding 300-5 is stored in the aqueous medium. As described above, in this embodiment, it is suitable that the weight ratio of the urethane resin powder contained in the molding material 200 to the total weight of the molding material 200 falls within a range of 5% to 60%. The result illustrated in FIG. 6 makes it possible to say that this point, which means setting the upper limit of the weight ratio of the urethane resin powder to the total weight of the molding material 200 to 60%, is valid from the viewpoint of maintaining the shape of the three-dimensional molding 300 being a completed product when the three-dimensional molding is stored in the aqueous medium.

According to the first embodiment of the present invention, the molding material obtained by mixing the urethane resin powder with the gypsum powder is used to form the three-dimensional molding 300 by the powder lamination method and the urethane resin is impregnated into the three-dimensional molding 300, and thus as has been explained using FIG. 4, it is possible to form a three-dimensional molding having a strength higher than that of the three-dimensional molding formed by using a molding material in which the urethane resin powder is not mixed with the gypsum powder (0%). Further, as has been explained using FIG. 5, the urethane resin impregnation enables the three-dimensional molding to be softer, though being slight, than the three-dimensional molding 300 before being impregnated with the urethane resin. Furthermore, according to the first embodiment of the present invention, the three-dimensional molding 300 is impregnated with the urethane resin to then be dipped in the aqueous medium, and thus as has been explained using FIG. 5, it is possible to form a softer three-dimensional molding. For example, application of the technique of this embodiment to the medical field enables formation of a three-dimensional molding that has reproduced an individual patient's internal organ in a form closer to the real thing, and thus for example, the formed three-dimensional molding can be used for a surgical operation training, and the like, resulting in that it becomes possible to achieve an improvement in medical care quality.

Second Embodiment

Next, there will be explained a schematic configuration of a three-dimensional molding producing apparatus according to a second embodiment of the present invention.

FIG. 7 is a block diagram illustrating one example of a schematic configuration of a three-dimensional molding producing apparatus 400 according to the second embodiment of the present invention. In FIG. 7, the same reference numerals are added to the same components as those in the schematic configuration of the three-dimensional molding producing apparatus 100 according to the first embodiment illustrated in FIG. 1, and their detailed explanations are omitted.

The three-dimensional molding producing apparatus 400 according to this embodiment is configured by including: an information input device 110; an information processing/control device 120; a three-dimensional molding forming device 130; a first heat treatment device 140; a urethane resin impregnating device 150; a second heat treatment device 160; a soft resin forming device 410; a third heat treatment device 420; and an aqueous medium dipping device 430, as illustrated in FIG. 7.

In FIG. 7, since the information input device 110, the information processing/control device 120, the three-dimensional molding forming device 130, the first heat treatment device 140, the urethane resin impregnating device 150, and the second heat treatment device 160 are the same as the components in the three-dimensional molding producing apparatus 100 according to the first embodiment illustrated in FIG. 1, their explanations are omitted. However, the information processing/control device 120 controls the respective devices (130 to 160, 410 to 430) in the three-dimensional molding producing apparatus 400 based on various pieces of information input from the information input device 110.

The soft resin forming device 410 is a device that forms, in a hollow region of the three-dimensional molding 300-4, a soft resin softer than this three-dimensional molding in accordance with the control by the information processing/control device 120.

Here, there will be explained a soft resin 500 to be used in the soft resin forming device 410.

The soft resin 500 in this embodiment is formed of, as a main material, a urethane resin obtained by mixing a polyisocyanate compound and the like with a polyol compound. Concretely, the soft resin 500 in this embodiment is formed by containing, as a main material, a two-component mixed urethane resin of a polyol compound being a main ingredient and a curing agent such as a polyisocyanate compound, and the like (for example, a curing agent containing polyisocyanate, diisononyl phthalate (DINP), and hexamethylene diisocyanate, and the like). On this occasion, as for the above-described curing agent, and the like, a weight ratio of the polyisocyanate to the total weight of the curing agent, and the like suitably falls within a range of 10% to 20%, a weight ratio of the diisononyl phthalate to the total weight of the curing agent, and the like suitably falls within a range of 80% to 90%, and a weight ratio of the hexamethylene diisocyanate to the total weight of the curing agent, and the like is suitably 0.15% or less. Further, this embodiment is set that the soft resin 500 is formed by containing, in addition to the above-described main material, an ultrasonic scattering material intended for showing the soft resin formed in the hollow region of the three-dimensional molding 300 in ultrasonic imaging. On this occasion, in this embodiment, a urethane resin powder is used as the ultrasonic scattering material, but the present invention is not limited to this, and for example, a carbon powder or a gypsum powder may be used. Further, it is also possible to mix pigments in the soft resin 500 in this embodiment to give various colors to a soft resin to be formed in the three-dimensional molding 300.

Hereinafter, there will be described a weight ratio of the ultrasonic scattering material to be contained in the soft resin 500. The weight ratio of the ultrasonic scattering material to be contained in the soft resin 500 to the total weight of the two-component mixed urethane resin to be contained in the soft resin 500 suitably falls within a range of 10% to 25% from the viewpoint of showing the soft resin formed in the hollow region of the three-dimensional molding 300 in ultrasonic imaging. This is because the case when the weight ratio of the ultrasonic scattering material to the total weight of the two-component mixed urethane resin to be contained in the soft resin 500 becomes less than 10% and the case when it exceeds 25% cause a problem that it becomes difficult to show the soft resin formed in the hollow region in the three-dimensional molding 300 in ultrasonic imaging.

The third heat treatment device 420 is a device that heat treats (third heat treats) a three-dimensional molding 300-6 containing therein a soft resin sr formed in the soft resin forming device 410 at a predetermined temperature in accordance with the control by the information processing/control device 120. In this embodiment, the third heat treatment device 420 performs a heat treatment for about three hours on the three-dimensional molding 300-6 at a temperature of about 60° C. In this example, by the third heat treatment by the third heat treatment device 420, the soft resin sr in the three-dimensional molding 300-6 is cured.

The aqueous medium dipping device 430 is a device that dips a three-dimensional molding 300-7 resulting from the heat treatment in the third heat treatment device 420 in an aqueous medium in accordance with the control by the information processing/control device 120. Here, the aqueous medium is not limited in particular as long as it does not impair strength and softness of the three-dimensional molding 300, but there can be cited a water, a physiological saline solution, a buffer solution, aqueous organic solvents such as glycerin and ethylene glycol, a mixture of these, and so on, and it is also possible to dissolve a water-soluble substance in these. Further, as one aspect, it is possible to add an antiseptic and antifungal agent to the above-described aqueous medium. The antiseptic and antifungal agent is not limited in particular as long as it has an antiseptic and antifungal function for the three-dimensional molding 300-7 and the aqueous medium and is a water-soluble antiseptic and antifungal agent that does not affect strength and softness of the three-dimensional molding 300, but considering handling and performing a surgical operation training, and the like, low irritating ones are preferred, there can be cited hydrogen peroxide, hypochlorous acid, sodium hypochlorite, phenoxyethanol, sodium benzoate, p-hydroxybenzoate ester or its salt, and so on, and each of them can be used at an appropriate concentration that enables exhibition of the antiseptic and antifungal function. In this embodiment, it is suitable that the aqueous medium dipping device 430 dips, for example, the three-dimensional molding 300-7 in the aqueous medium having a temperature of 80° C. to 95° C. for about one hour. Then, on the occasion of performing a surgical operation training, or the like, for example, the three-dimensional molding producing apparatus 400 performs a process of taking a three-dimensional molding 300-8 out of the aqueous medium dipping device 430.

Incidentally, although the example illustrated in FIG. 7 illustrates a mode in which three heat treatment devices: the first heat treatment device 140; the second heat treatment device 160; and the third heat treatment device 420 are provided, this embodiment is not limited to this mode, and for example, a mode in which a single heat treatment device is provided to perform the first heat treatment by the first heat treatment device 140, the second heat treatment by the second heat treatment device 160, and the third heat treatment by the third heat treatment device 420 is also applicable to this embodiment. Further, in the case of letting the three-dimensional molding 300 dry naturally over a long period of time, or the like, a mode in which at least one of the first heat treatment device 140, the second heat treatment device 160, and the third heat treatment device 420 is not provided or all of them are not provided is also applicable to this embodiment. For example, in the case where the third heat treatment device 420 is not provided and the soft resin sr in the three-dimensional molding 300-6 is made to react over a long period of time, or the like, reaction for about 24 hours at room temperature is required.

Next, there will be explained a process procedure of a three-dimensional molding producing method to be performed by the three-dimensional molding producing apparatus 400 according to the second embodiment of the present invention.

FIG. 8 is a flowchart illustrating one example of the process procedure in the three-dimensional molding producing method to be performed by the three-dimensional molding producing apparatus 400 according to the second embodiment of the present invention. Hereinafter, processes of the flowchart illustrated in FIG. 8 will be explained with reference to FIG. 7. Further, the same step numbers are added to the same process steps in the processes of the flowchart illustrated in FIG. 8 as those in the processes of the flowchart in the first embodiment illustrated in FIG. 2, and their detailed explanations are omitted.

In the processes of the flowchart illustrated in FIG. 8, first, the processes at Steps S1 to S9 in the flowchart in the first embodiment illustrated in FIG. 2 are performed. Thereby, the three-dimensional molding 300-4 illustrated in FIG. 7 is obtained.

Subsequently, at Step S21 in FIG. 8, the soft resin forming device 410 in FIG. 7 performs a process of forming, in the hollow region of the three-dimensional molding 300-4, a soft resin softer than this three-dimensional molding in accordance with the control by the information processing/control device 120. Here, as described above, the soft resin 500 to be used in the soft resin forming device 410 is formed by containing, as a main material, the two-component mixed urethane resin of the polyol compound being a main ingredient, a curing agent such as the polyisocyanate, and the like, and further containing, in addition to this main material, the ultrasonic scattering material intended for showing the soft resin formed in the hollow region of the three-dimensional molding 300 in ultrasonic imaging.

Subsequently, at Step S22 in FIG. 8, the third heat treatment device 420 in FIG. 7 heat treats (third heat treats) the three-dimensional molding 300-6 containing therein the soft resin sr formed in the soft resin forming device 410 at a predetermined temperature in accordance with the control by the information processing/control device 120. In this embodiment, the third heat treatment device 420 performs a heat treatment for about three hours on the three-dimensional molding 300-6 at a temperature of about 60° C.

Subsequently, at Step S23 in FIG. 8, the aqueous medium dipping device 430 in FIG. 7 performs a process of dipping the three-dimensional molding 300-7 resulting from the heat treatment in the third heat treatment device 420 in the aqueous medium in accordance with the control by the information processing/control device 120. Then, for example, on the occasion of performing a surgical operation training, or the like, the three-dimensional molding producing apparatus 400 performs a process of taking the three-dimensional molding 300-8 out of the aqueous medium dipping device 430.

Incidentally, in the case of letting the three-dimensional molding 300 dry naturally over a long period of time, or the like, according to need, a mode in which at least one of the first heat treatment at Step S7 in FIG. 8, the second heat treatment at Step S9 in FIG. 8, and the third heat treatment at Step S22 in FIG. 8 is omitted or all of them are omitted is also applicable to this embodiment. For example, in the case where the third heat treatment at Step S22 in FIG. 8 is not performed and the soft resin sr in the three-dimensional molding 300-6 is made to react over a long period of time, or the like, reaction for about 24 hours at room temperature is required.

After the process at Step S23 in FIG. 8 is completed, the processes of the flowchart illustrated in FIG. 8 are completed. By the processes of the flowchart illustrated in FIG. 8, the three-dimensional molding 300 formed by containing the gypsum and the urethane resin and (further containing the antiseptic and antifungal agent) by the powder lamination method and containing the soft resin sr formed therein is produced.

Next, there will explained results of ultrasonic imaging conducted by the present inventor. Concretely, the ultrasonic imaging to be explained below was performed using an ultrasonograph "LogiQ-S8" produced by GE Healthcare in a manner that a frequency Fq at the time of imaging was set to 8 MHz and a frame rate FR was set to 36.

Figure 9A:
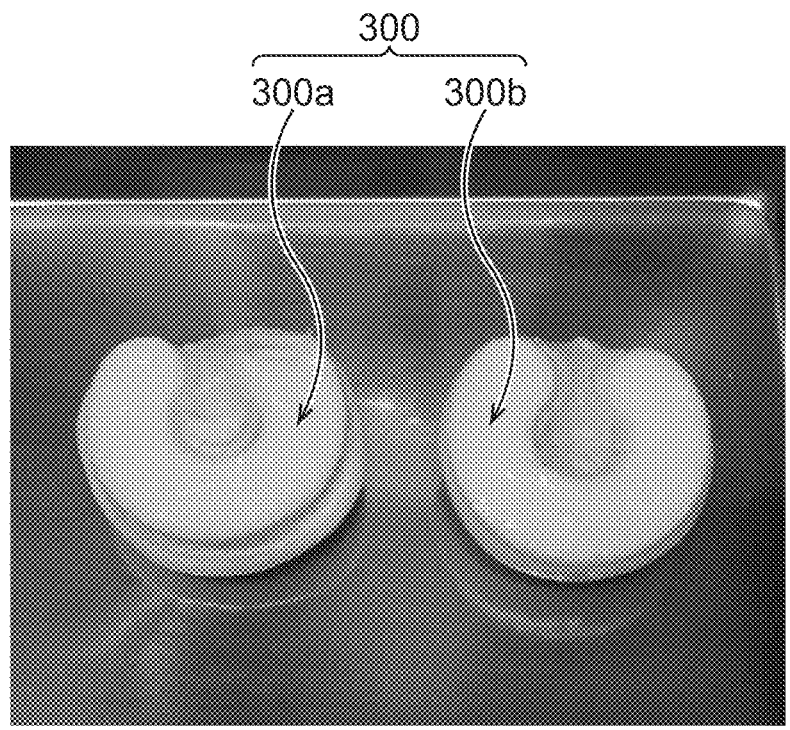
FIG. 9A is a view showing an ultrasonically imaged three-dimensional molding.

FIG. 9A is a view showing the ultrasonically imaged three-dimensional molding 300. Concretely, FIG. 9A shows three-dimensional molding divided pieces 300a and 300b obtained by dividing the ultrasonically imaged three-dimensional molding 300 into two.

Figure 9B:
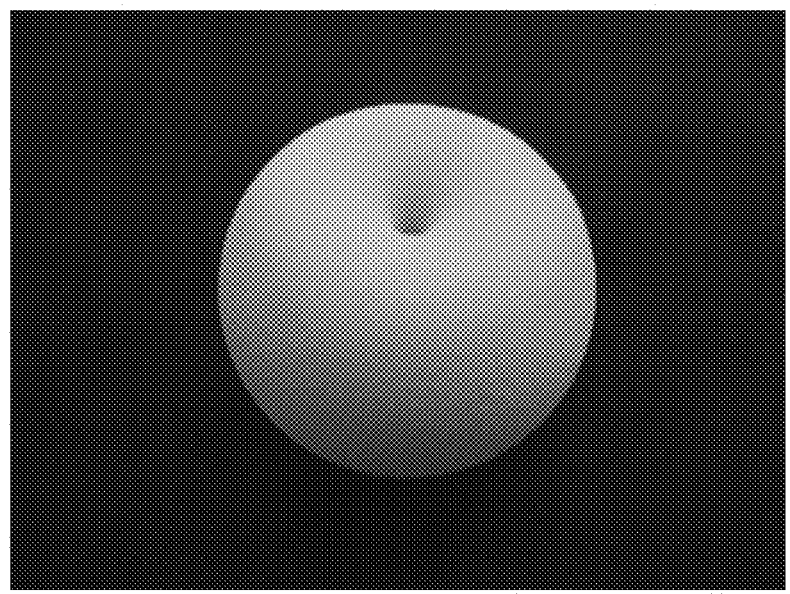
FIG. 9B is an appearance view of a three-dimensional molding produced without forming a hollow region (that is, without forming a soft resin, the entire part including a soft resin part is produced of a molding material obtained by mixing powders), which illustrates a comparative example.

Further, FIG. 9B is an appearance view of the three-dimensional molding 300 produced without forming the hollow region (that is, without forming the soft resin, the entire part including a soft resin part is produced of the molding material obtained by mixing the powders), which illustrates a comparative example.

Figure 9C:
FIG. 9C is a view showing a result obtained by ultrasonically imaging the three-dimensional molding in FIG. 9B produced without forming a hollow region (that is, without forming a soft resin, the entire part including a soft resin part is produced of a molding material obtained by mixing powders), which illustrates the comparative example.

FIG. 9C is a view showing a result obtained by ultrasonically imaging the three-dimensional molding 300 in FIG. 9B produced without forming the hollow region (that is, without forming the soft resin, the entire part including a soft resin part is produced of the molding material obtained by mixing the powders), which illustrates the comparative example.

The result shown in FIG. 9C reveals that the inside of the three-dimensional molding 300 was not able to be shown in ultrasonic imaging. This is because the inside of the three-dimensional molding 300, from which the result shown in FIG. 9C was able to be obtained, was produced without forming the hollow region (that is, without forming the hollow region, the entire part including a soft resin part was produced of the molding material obtained by mixing the powders), and thus ultrasonic waves were absorbed near the surface of the three-dimensional molding 300 and did not propagate in the inside, and thus only the contour is shown.

Figure 9D:
FIG. 9D is a view showing a result obtained by ultrasonically imaging the three-dimensional molding in FIG. 9A having the soft resin formed in the hollow region, which illustrates the second embodiment of the present invention.

FIG. 9D is a view showing a result obtained by ultrasonically imaging the three-dimensional molding 300 in FIG. 9A having the soft resin sr formed in the hollow region, which illustrates the second embodiment of the present invention.

The result shown in FIG. 9D reveals that the region in the three-dimensional molding 300, in which the soft resin sr was formed, was able to be shown in ultrasonic imaging. This is conceivably because the above was able to be obtained as a result of containing the above-described ultrasonic scattering material in the soft resin 500. Further, it is conceived that the three-dimensional molding, which provided the ultrasonic imaging result in FIG. 9C, was produced of only the molding material obtained by mixing the powders and ultrasonic waves did not propagate in the inside, while the three-dimensional molding, which provided the ultrasonic imaging result in FIG. 9D, had the hollow region provided therein, and thus the surface portion of the three-dimensional molding produced of the molding material obtained by mixing the powders was thin in thickness, ultrasonic waves reached the soft resin sr formed in the hollow region to propagate therein, and the above-described ultrasonic scattering material was contained in the soft resin 500, resulting in that the ultrasonic waves were scattered moderately and the result was obtained. Incidentally, a black band-shaped region near the center in FIG. 9D resulted from the fact that at the time of ultrasonic imaging, air entered between an outer shell portion of the hollow region, which corresponds to the upper portion of this black band and is produced of the molding material obtained by mixing the powders, and the soft resin formed in the hollow region under the outer shell portion to prevent ultrasonic waves from propagating in the soft resin, and thus the soft resin containing the ultrasonic scattering material was not able to be shown to form a black hand-shaped region. Unless air enters therebetween, ultrasonic waves are to propagate in the soft resin and the portion in which the ultrasonic waves are scattered is to be shown whitely in the same manner as in the right and left portions of the black band-shaped region, and thus this black band-shaped region does not affect the explanation of the effect of the invention.

According to the second embodiment of the present invention, since in the hollow region of the three-dimensional molding 300, the soft resin sr softer than this three-dimensional molding is designed to be formed, it is possible to form the three-dimensional molding 300 having a portion having a different softness, in addition to the effects in the first embodiment. Furthermore, according to the second embodiment of the present invention, since the soft resin is designed to be formed by containing the ultrasonic scattering material intended for showing this soft resin formed in the hollow region of the three-dimensional molding 300 in ultrasonic imaging, it is also possible to form the three-dimensional molding 300 capable of being imaged by an ultrasonograph. For example, when the technique of this embodiment is applied to the medical field, for example, a lesion part is reproduced with the soft resin sr, thereby making it possible to form a three-dimensional molding that has reproduced an individual patient's internal organ in a form closer to the real thing, and thus it is possible to use, for example, the formed three-dimensional molding for a general surgical operation training, a surgical operation training utilizing an ultrasonograph, and the like, resulting in that it becomes possible to achieve an improvement in medical care quality.

It should be noted that the above-described embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

The invention claimed is:

1. A three-dimensional molding producing method, comprising:
   using a molding material obtained by mixing a urethane resin powder with a gypsum powder and forming a three-dimensional molding by a powder lamination method; and
   impregnating a urethane resin into the three-dimensional molding.

2. The three-dimensional molding producing method according to claim 1, further comprising:
   after the impregnating the urethane resin is completed, dipping the three-dimensional molding in an aqueous medium.

3. The three-dimensional molding producing method according to claim 2, wherein
   an antiseptic and antifungal agent is dissolved in the aqueous medium.

4. The three-dimensional molding producing method according to claim 2, further comprising:
   after the impregnating the urethane resin is completed and before the dipping in the aqueous medium, forming, in a hollow region of the three-dimensional molding, a soft resin softer than the three-dimensional molding.

5. The three-dimensional molding producing method according to claim 4, wherein
   the soft resin is formed of a urethane resin as a main material.

6. The three-dimensional molding producing method according to claim 5, wherein
   the soft resin is formed by containing, in addition to the main material, an ultrasonic scattering material intended for showing the soft resin formed in the hollow region in ultrasonic imaging.

7. The three-dimensional molding producing method according to claim 1, wherein
   a weight ratio of the urethane resin powder to a total weight of the molding material is 5% to 60%.

8. A three-dimensional molding producing apparatus, comprising:
   a three-dimensional molding forming means that forms a three-dimensional molding by a powder lamination method by using a molding material obtained by mixing a urethane resin powder with a gypsum powder and; and
   a urethane resin impregnating means that impregnates a urethane resin into the three-dimensional molding.

9. The three-dimensional molding producing apparatus according to claim 8, further comprising:
   an aqueous medium dipping means that dips the three-dimensional molding in an aqueous medium after impregnation of the urethane resin by the urethane resin impregnating means is completed.

10. The three-dimensional molding producing apparatus according to claim 9, wherein
    an antiseptic and antifungal agent is dissolved in the aqueous medium.

11. The three-dimensional molding, producing apparatus according to claim 9, further comprising:
    a soft resin forming means that forms, in a hollow region of the three-dimensional molding, a soft resin softer than the three-dimensional molding after impregnation of the urethane resin by the urethane resin impregnating means dipping in the aqueous medium by the aqueous medium dipping means.

12. The three-dimensional molding producing apparatus according to claim 11, wherein
    the soft resin is formed of a urethane resin as a main material.

13. The three-dimensional molding producing apparatus according to claim 12, wherein
    the soft resin is formed by containing, in addition to the main material, an ultrasonic scattering material intended for showing the soft resin formed in the hollow region in ultrasonic imaging.

14. The three-dimensional molding producing apparatus according to claim 8, wherein
    a weight ratio of the urethane resin powder to a total weight of the molding material is 5% to 60%.

15. A three-dimensional molding comprising:
    a three dimensional molding formed by laminating layers containing gypsum and a urethane resin; and
    a soft resin softer than the three-dimensional molding is formed in a hollow region of the three-dimensional molding.

16. The three-dimensional molding according to claim 15, wherein
    the soft resin is formed of a urethane resin as a main material.

17. The three-dimensional molding according to claim 16, wherein
    the soft resin is formed by containing, in addition to the main material, an ultrasonic scattering material intended for showing the soft resin formed in the hollow region in ultrasonic imaging.

* * * * *